United States Patent [19]

Glaser et al.

[11] Patent Number: 5,837,361
[45] Date of Patent: Nov. 17, 1998

[54] SUBSTRATES COATED WITH A STACK OF THIN LAYERS HAVING REFLECTION PROPERTIES IN THE INFRARED AND/OR WITH RESPECT TO SOLAR RADIATION

[75] Inventors: Hans Glaser, Gummersbach; Bernhard Heinz, deceased, late of Aachen; Peter Heinz, heir; Ursula Heinz, heiress, both of Saarburg, all of Germany

[73] Assignee: Saint-Gobain Vitrage, Courbevoie, France

[21] Appl. No.: 746,489

[22] Filed: Nov. 12, 1996

[30] Foreign Application Priority Data

Nov. 10, 1995 [DE] Germany .................. 195 41 937.5

[51] Int. Cl.$^6$ .............................. B32B 7/02; B32B 15/08
[52] U.S. Cl. .................... 428/216; 359/580; 359/585; 359/588; 359/589; 427/162; 427/164; 428/212; 428/336; 428/428; 428/432; 428/469; 428/472; 428/701; 428/702
[58] Field of Search ..................... 428/216, 336, 428/701, 702, 428, 432, 469, 472, 212; 359/580, 585, 588, 9; 427/162, 164

[56] References Cited

U.S. PATENT DOCUMENTS

| | | | |
|---|---|---|---|
| 4,799,745 | 1/1989 | Meyer et al. | 350/1.7 |
| 4,973,511 | 11/1990 | Farmer et al. | 428/316 |
| 5,110,662 | 5/1992 | Depauw et al. | 428/216 |
| 5,271,994 | 12/1993 | Termath | 428/469 |
| 5,506,037 | 4/1996 | Termath | 428/472 |
| 5,510,173 | 4/1996 | Pass et al. | 428/432 |

FOREIGN PATENT DOCUMENTS

| | | |
|---|---|---|
| 456487 | 11/1991 | European Pat. Off. . |
| 622645 | 11/1994 | European Pat. Off. . |

*Primary Examiner*—Archene Turner
*Attorney, Agent, or Firm*—Oblon, Spivak, McClelland, Maier & Neustadt, P.C.

[57] ABSTRACT

A coated substrate comprises a transparent substrate, a lower coating on the transparent substrate, a functional layer on the lower coating, and an upper coating on the functional layer. The lower coating has a first layer comprising silicon or a metal, and nitrogen or oxygen, and a second layer comprising zinc oxide and having a thickness of at least 16 nm. The second layer is in contact with the functional layer.

21 Claims, No Drawings

SUBSTRATES COATED WITH A STACK OF THIN LAYERS HAVING REFLECTION PROPERTIES IN THE INFRARED AND/OR WITH RESPECT TO SOLAR RADIATION

BACKGROUND OF THE INVENTION

1. Field of the Invention

The invention relates to transparent substrates, especially substrates made of glass or of rigid plastic of the polycarbonate PC or polymethyl methacrylate PMMA type. The substrates are coated with a stack of thin layers comprising at least one metallic layer which can act on solar radiation and/or on long-wavelength infrared radiation.

The invention also relates to the use of these substrates for manufacturing thermally insulating glazing panels and/or anti-solar windows. These are is intended both to equip buildings and vehicles, especially for decreasing the air-conditioning load and/or of reducing excessive overheating caused by the ever-increasing extent of glazed surfaces in the passenger compartment.

2. Background of the Invention

Known types of stacks of thin layers, intended to give a substrate low emissivity properties, consists of at least one metallic layer, such as a silver layer, arranged between two layers of dielectric material, such as layers of a metal oxide, or of a nitride such as $Si_3N_4$. This stack is generally obtained by a succession of depositions using a vacuum technique, such as sputtering optionally assisted by a magnetic field. In general, prior to deposition of the upper dielectric coating, the silver layer is covered with a thin layer of metal called the "sacrificial" layer.

Although the silver layer essentially determines the thermal performance characteristics, especially in terms of emissivity of the coated glazing panel, the layers of dielectric material fulfill several roles. First, the dielectric materials act interferentially on the optical appearance of the substrate. Second, they enable the silver layer to be protected from chemical and/or mechanical attack.

The glazing panels provided with this type of low-emissivity stack are particularly useful as an insulating glazing. In the case of a predefined structure, the thermal transmission coefficient of an insulating glazing panel is, in fact, essentially determined by the emissivity of the two glass surfaces delimiting the space between the glass sheets. The emissivity E of uncoated glass surfaces is relatively high, approximately 0.85. Radiation exchange between the glass surfaces may, more or less, be eliminated by the use of glass sheets provided with a weakly emissive coating having an emissivity $E \leq 0.1$ on the face turned towards the intermediate gas space. In this way, it is possible to manufacture insulating glazing panels having a heat transfer coefficient K of 1.3 $W/m^2K$ or less, these low values allowing for substantial energy savings.

In addition to a low K coefficient, an optimum insulating glazing panel must also have a solar factor as high as possible, expressed as a coefficient C as defined in the standard DIN 67507, so that the passive utilization of the solar energy is high and provides a favorable energy balance of a building. This coefficient C is the sum of the energy transmitted directly through the glazing panel and the energy re-emitted into the room or into the passenger compartment by the glazing panel which has been heated by absorption. Furthermore, the color of this glazing panel in reflection to the outside space must be neutral, like that of a conventional insulating glazing panel.

A decrease in the emissivity of a multilayer stack comprising a functional layer made of silver may be achieved, in principle, by means of thicker silver layers. However, increasing the thickness of the silver layer is limited by the decreasing light transmission. Furthermore, the thick silver layers no longer have a neutral color in reflection. Nevertheless, if it is desired to obtain a low emissivity with relatively thick silver layers, while still maintaining a sufficiently high light transmission and, simultaneously, a neutral color in reflection, this is only possible if the coatings of dielectric material are carefully chosen, especially by choosing a coating made up of several different layers of dielectric material.

EP-0,332,177 B1 describes a multilayer system of the kind described above. In this multilayer system, one of the two dielectric coatings consists of one or more layers each having a refractive index of approximately 2.35, and the other coating consists of one or more layers having a markedly lower refractive index. Bismuth oxide serves as the layer with a refractive index of 2.35.

A system having "multilayer" coatings of dielectric material is also known from Patents DE-3,941,027 A1 and FR-2,641,271. In this stack, the "lower" dielectric coating (that is to say the coating closest to the substrate) consists of at least one layer of a metal oxide, belonging to the class formed by tin oxide, titanium oxide, aluminum oxide, bismuth oxide or a mixture of two or more of these oxides, and of a zinc oxide layer with a thickness of at most 15 nm, preferably of from 5 to 13 nm, this layer being contiguous with the silver layer. The thin zinc oxide layer below the silver layer is stated to exert a favorable effect on the silver layer which, however, can only be observed when the thickness of the zinc oxide layer lies below the maximum permissible value of 15 nm. Thicker layers of ZnO are stated to be chemically more fragile and, therefore, they then lead to a reduction in the durability of the entire stack of thin layers.

SUMMARY OF THE INVENTION

An object of the invention is to provide a new type of stack, having one or more functional layers, which has both improved thermal and optical properties.

Another object of the invention is to provide a new type of stack having both low emissivity and high light transmission.

Another object of the invention is to provide a stack of thin layers which comprises a zinc oxide layer deposited below a silver layer, exploiting the favorable effects of the zinc oxide layer and making it possible to simultaneously obtain high chemical resistance and high physical strength, as well as low emissivity and high total energy transmission, together with a high degree of color neutrality both in transmission and reflection.

Another object of the invention is to provide a stack which may be produced on an industrial scale, without any technical manufacturing difficulty, at high deposition rates.

Another object of the invention is to provide a stack which may be prepared using the process of sputtering, optionally assisted by a magnetic field.

These objects are provided by a coated substrate, comprising (I) a transparent substrate, (II) a lower coating on said transparent substrate, comprising (a) a first layer comprising (i) silicon or a metal, and (ii) nitrogen or oxygen, and (b) a second layer comprising zinc oxide and having a thickness of at least 16 nm, (III) a functional layer on said lower coating, and (IV) an upper coating comprising a dielectric material, on said functional layer; wherein (b) said second layer is in contact with (III) said functional layer.

These objects are also provided by a method of making a coated substrate, comprising applying a lower coating on a transparent substrate, said lower coating comprising (a) a first layer comprising (i) silicon or a metal, and (ii) nitrogen or oxygen, and (b) a second layer comprising zinc oxide and having a thickness of at least 16 nm; applying a functional layer on said lower coating; and applying an upper coating comprising a dielectric material, on said functional layer; wherein said second layer is in contact with said functional layer, and said functional layer has a thickness of 7 to 25 nm and comprises silver.

DETAILED DESCRIPTION OF THE INVENTION

In the present invention a transparent substrate, especially made of glass (or any other rigid plastic of the polycarbonate or PMMA type), which is provided with a, stack of thin layers comprising at least one layer having properties in the infrared and/or with respect to solar radiation, especially a metallic layer of low emissivity. This layer is denoted by the term "functional" layer and is preferably made of silver or a material based on silver.

The functional layer is arranged between two coatings made of dielectric material, a lower coating closest to the substrate, and an upper coating furthest away from the substrate. The coating subjacent to the functional layer, the lower coating, comprises at least two different layers made of dielectric material, including at least one layer of a silicon or metal nitride or oxide, and a layer based on zinc oxide having a thickness of greater than or equal to 16 nm and in direct contact with the functional layer.

According to the invention, the functional layer is preferably based on silver, especially with a thickness of 7 to 25 nm, preferably 10 to 14 nm, and more preferably approximately 12 nm. Approximately 12 nm may be 11.5 to 12.5 nm.

In the lower coating, the layer based on zinc oxide preferably has a thickness of 16 to 35 nm, more preferably 16 to 25 nm, even more preferably approximately 22 nm. Approximately 22 nm may be 21.5 to 22.5 nm. The lower coating preferably comprises, below this zinc oxide layer, another layer based on a metal oxide, of the bismuth oxide or tin oxide type, or based on silicon nitride. This second layer preferably has a thickness of from 5 to 35 nm, more preferably from 15 to 25 nm.

Optionally, the functional layer may be surmounted by a thin layer, called a sacrificial layer, based on a metal, of the niobium, titanium, tin or tantalum type, or on a metal alloy of the nickel-chromium, tantalum-chromium or niobium-chromium type, preferably with a thickness of 0.5 to 6 nm, more preferably 1 to 3 nm. This layer is called "sacrificial" since its role is to protect the functional layer from oxidation during the subsequent deposition of the dielectric material above it, this deposition usually being carried out by reactive sputtering, typically in the presence of oxygen if the dielectric material is a metal oxide. In the final product, this sacrificial layer is, depending on its thickness and the deposition conditions, partially or completely oxidized.

The upper coating of dielectric material which lies above the functional layer preferably comprises at least one layer based on tin oxide, tantalum oxide, zinc oxide, niobium oxide, titanium oxide or bismuth oxide, and/or a layer of silicon nitride. This upper coating preferably comprises at least one layer based on tin oxide, preferably with a thickness of 2 to 35 nm, more preferably 5 to 30 nm, and a layer based on bismuth oxide, preferably with a thickness of 5 to 35 nm, more preferably of 15 to 30 nm. The layer based on tin oxide is even more preferably chosen with a thickness of from 5 to 25 nm, especially even more preferably 5 to 15 nm. The same applies to the layer based on bismuth oxide.

In the case of the upper coating, the invention has two alternative forms: either the bismuth oxide layer lies above the tin oxide layer, or tin oxide layer lies above the bismuth oxide layer.

The upper coating may advantageously comprise a plurality of layers, the last of which has greater durability. This last layer may be a layer based on titanium oxide. The thickness of this last layer is preferably 3 to 10 nm.

The invention is also multiple glazing panels of the insulating, low-emissivity type which incorporate at least one substrate coated with a stack. If the panel is a double-glazing panel, the multilayer stack is preferably arranged as face 3 and/or as face 2, while if it is a triple-glazing panel it may have a stack as face 3 or as face 5 or on both of these faces. (It will be recalled that, conventionally, the faces are numbered from the outside, once the glazing panel has been fitted).

The invention also relates to laminated glazing panels incorporating at least one substrate coated with the multilayer stack. They may then advantageously be used as anti-solar windows, and are particularly useful for equipping motor vehicles, given their high light transmission. It is also possible to use them as heated windows, by providing current leads for the layers having properties in the infrared, of the silver type. These layers have a low emissivity, and also have a high electrical conductivity.

The use of the substrates according to the invention is highly varied, since they may be used both in the manufacture of insulating multiple-glazing panels and in the manufacture of laminated glazing panels. It is thus possible to manufacture double glazing panels whose emissivity is less than or equal to 0.05, preferably less than 0.045, but with light transmission nevertheless very high; light transmission may in fact be greater than or equal to 75%. These double-glazing panels may also have a K coefficient of approximately 1.1 W/m$^2$K and/or a G factor of approximately 58 to 60%. Approximately 1.1 W/m$^2$K may be 1.05 to 1.15 W/m$^2$K.

The stack of the invention may also be advantageously applied to substrates having not just one but several functional layers, for example two functional layers sandwiched between three coatings based on dielectric material. In this case, at least one of the functional layers is provided with the lower coating according to the invention. The thicknesses of the silver layers and the overall thicknesses of the dielectric coatings on each side of these silver layers may preferably be chosen within the ranges recommended in Patent Application EP-0,638,528. According to the terminology of the present application, the upper coating on the silver layer closest to the substrate will in fact be the dielectric coating separating the two silver layers.

According to a preferred embodiment, the structure of the stack in accordance with the invention is characterized in that the two layers of metal oxide of the lower coating consist of a bismuth oxide layer with a thickness of from 15 to 25 nm and of a zinc oxide layer with a thickness of from 16 to 22 nm, this layer being contiguous with the silver layer. In this preferred embodiment the two layers of metal oxide of the upper coating consist of a tin oxide layer with a thickness of from 5 to 30 nm, preferably from 5 to 25 nm, and of a bismuth oxide layer with a thickness of from 15 to 30 nm, preferably from 15 to 25 nm.

The bismuth oxide layers do not necessarily have to consist of pure bismuth oxide. They may, as the case may be, also contain small quantities of other metal oxides or metal compounds on the condition, preferably that the optical properties, in particular the refractive index, of these layers are not substantially modified. The same applies to all the other layers of the coatings of dielectric material, especially for the layers based on ZnO.

Surprisingly, the drawbacks relating to physical weakening of the silver layer are not found in the present invention. The reduced chemical resistance expected when increasing the thickness of the zinc oxide layer under the silver layer, do not materialize, contrary to expectations, when the multilayer has the structure in accordance with the invention. In particular, it has turned out that the crystalline growth of the zinc oxide layer, which occurs in zinc oxide layers having a thickness greater than 15 nm, is very advantageous for the emissivity of the silver layer. It seems, in fact, that by virtue of an at least partially crystalline zinc oxide layer, the silver sputtered subsequently also grows substantially in the crystalline state. A crystalline structure of the silver layer leads to increased mobility of the charge carriers, and thus to a further reduction in the emissivity E because the emissivity E is inversely proportional to the mobility $\mu$ of the electrons in the silver layer, in accordance with the mathematical equation:

$$E = f\left(\frac{1}{en\mu d}\right)$$

where e is a constant representing the elementary charge, n is the density of the charge carriers, $\mu$ is the mobility of the charge carriers, and is the thickness of the silver layer.

Simultaneously, it is possible to provide, by using a lower coating which combines a bismuth oxide layer having a high refractive index with a layer having a low refractive index formed from zinc oxide, that a stack that gives the overall substrate a very neutral color in transmission and a very neutral color in reflection. The very neutral color is not modified even with small variations in the thicknesses of the layers within the range of the manufacturing tolerances. This neutrality is all the more pronounced when, as an upper coating, the combination of a bismuth oxide layer with a layer of lower refractive index, of the $SnO_2$ type, is also used.

Finally, the multilayer structure in accordance with the preferred embodiment using a layer based on bismuth oxide on each side of the functional layer, leads to the additional advantage that an optimum neutral color effect is exerted on the silver layer even when the silver layer is applied with a thickness $\geq 12$ nm, this layer of material having a high refractive index, above and below the silver layer. This turns out to be favorable for obtaining as low an emissivity as possible: it is thus possible to reconcile the colorimetry objectives with those related to the thermal performance characteristics of the coated substrate.

As has already been noted, the bismuth oxide layer having a high refractive index may be arranged, in the upper coating, either between the sacrificial layer and the tin oxide layer, or else on top of the tin oxide layer. Both of these possible arrangements offer special advantages which may be exploited in order to improve the properties of the multilayer stack in the desired direction in both cases. For example, the coefficient is higher when the bismuth oxide layer is adjacent to the silver layer, whereas a particularly high chemical resistance of the multilayer stack is obtained with the arrangement of the tin oxide layer as the upper layer.

Moreover, the arrangement of the bismuth oxide layer above the tin oxide layer offers the advantage that the risk of oxidation of the silver, by possible exchange between the bismuth oxide layer and the silver layer, is lower so that the sacrificial layer of metal may be chosen to be thinner. Furthermore, measures taken to avoid the known "solarization" effect may be omitted. "Solarization" is the blackening of the silver layer due to the influence of UV radiation, which may appear when the bismuth oxide layer is contiguous with the silver layer.

It is possible to use, as the sacrificial layer of metal, known metals commonly used for this purpose, these metals having a higher affinity for oxygen than silver, and may be deposited in the form of a metal or as a suboxide on the silver layer. A layer of nickel-chromium with a thickness of from 1 to 3 nm has proved particularly effective.

Fundamentally, the process by which the multilayer stack is applied to the substrate does not play any role in determining the optical properties of the multilayer system according to the invention. In the examples given below, the layers are, however, without exception deposited using the process of sputtering. Furthermore, it seems that throughout, the best results are obtained by means of this process under industrial conditions.

EXAMPLES

Preferred embodiment examples of the multilayer stacks according to the invention are given hereinbelow.

Example Embodiment 1

Glass

| | |
|---|---|
| $Bi_2O_3$ | 20 nm |
| ZnO | 16 nm |
| Ag | 12 nm |
| NiCr (60/40) | 2 nm |
| $SnO_2$ | 12 nm |
| $Bi_2O_3$ | 20 nm |

The multilayer systems are produced in a continuous coating plant using magnetic-field-assisted sputtering, the oxide layers being sputtered reactively in an argon atmosphere containing oxygen, using metal targets. The sputtering of the metallic silver layer takes place in an argon atmosphere with addition of 5% by volume of hydrogen, and the sputtering of the sacrificial layer of metal takes place in pure argon. The glass sheet is a clear soda-lime silicate float glass with a thickness of 4 mm.

The glass sheet thus coated has the following optical properties:

| | |
|---|---|
| E (emissivity) | 0.03 |
| Light transmission according to DIN 67507 | 77% |

An insulating glazing panel consisting of two glass sheets coated in this way and including a 16 mm intermediate gas space filled with argon and with the coated glass surfaces oriented towards the internal gas space, has a G coefficient, according to the standard DIN 67507, of 58% and a K coefficient, according to the standard DIN 52612, of 1.1 $W/m^2K$.

Embodiment Example 2

The same type of sheet of float glass is coated ith a thickness of 4 mm of the following stack:

| Glass | |
|---|---|
| $Bi_2O_3$ | 19 nm |
| ZnO | 18 nm |
| Ag | 12 nm |
| NiCr | 2 nm |
| $SnO_2$ | 10 nm |
| $Bi_2O_3$ | 18 mn |
| $TiO_2$ | 6 nm |

The $TiO_2$ covering layer serves in this case as a protective layer for the multilayer stack. Since the $TiO_2$ has approximately the same optical properties as the subjacent $Bi_2O_3$ layer, the thickness of the $Bi_2O_3$ layer decreases by an amount which is the same as the thickness of the $TiO_2$ layer. The optical thickness of $Bi_2O_3/TiO_2$ sequence thus remains constant (the optical thickness of a layer is the product of its geometrical thickness and its refractive index). The corrosion resistance of the multilayer stack is appreciably increased by the layer of titanium dioxide.

This coated glass sheet has the following optical properties:

| E | 0.03 |
|---|---|
| Light transmission according to DIN 67507 | 77% |

An insulating glazing panel formed from these coated glass sheets and having the same structure and the same argon filling as in Example 1 has a G coefficient, according to the standard DIN 67507, of 58% and a K coefficient, according to the standard DIN 52612, of 1.1 $W/m^2K$.

Embodiment Example 3

A multiple layer stack having the following structure:

| Glass | |
|---|---|
| $Bi_2O_3$ | 19 nm |
| ZnO | 16 nm |
| Ag | 12 nm |
| NiCr | 2 nm |
| $Bi_2O_3$ | 17 mn |
| $SnO_2$ | 25 nm | is applied to the same sheet of float glass with a thickness of 4 mm.

Measuring the optical properties of the coated glass sheet gives the following results:

| E | 0.03 |
|---|---|
| Light transmission according to DIN 67507 | 77% |

An insulating glazing panel formed as in the previous examples using two sheets of glass coated in this way, with an argon filling, has a G coefficient, according to the standard DIN 67507, of 60% and a K coefficient, according to the standard DIN 52612, of 1.1 $W/m^2K$.

Obviously, numerous modifications and variations of the present invention are possible in light of the above teachings. It is therefore to be understood that within the scope of the appended claims, the invention may be practiced otherwise than as specifically described herein.

The priority document of the present application, German Patent Application No. 195 41 937.5 filed on Nov. 10, 1995, is hereby incorporated by reference.

What is claimed as new and desired to be secured by Letters Patent of the United States is:

1. A coated substrate, comprising:
   (I) a transparent substrate;
   (II) a lower coating on said transparent substrate, comprising:
      (a) a first layer comprising (i) silicon or a metal and (ii) nitrogen or oxygen, and
      (b) a second layer comprising zinc oxide and having a thickness of at least 16 nm;
   (III) a functional layer on said lower coating; and
   (IV) an upper coating comprising a dielectric material, on said functional layer;
   wherein (b) said second layer is in contact with (III) said functional layer, and (III) said functional layer has been formed onto (b) said second layer.

2. The coated substrate of claim 1, wherein said functional layer has a thickness of 7 to 25 nm and comprises silver.

3. The coated substrate of claim 1, wherein said second layer has a thickness of 16 to 35 nm.

4. The coated substrate of claim 1, wherein said first layer has a thickness of 5 to 35 nm and comprises a member selected from the group consisting of bismuth oxide, tin oxide and silicon nitride.

5. The coated substrate of claim 1, further comprising (V) a sacrificial layer, on said functional layer comprising at least one member selected from the group consisting of niobium, titanium, tin, tantalum, a nickel-chromium alloy, a tantalum-chromium alloy and a niobium-chromium alloy.

6. The coated substrate of claim 5, wherein (V) said sacrificial layer has a thickness of 0.5 to 6 nm.

7. The coated substrate of claim 1, wherein said upper coating comprises at least one layer comprising at least one dielectric selected from the group consisting tin oxide, zinc oxide, niobium oxide, titanium oxide, tantalum oxide, bismuth oxide and silicon nitride.

8. The coated substrate of claim 1, wherein said upper coating comprises:
   (c) a third layer having a thickness of 2 to 35 nm and comprising tin oxide; and
   (d) a fourth layer having a thickness of 5 to 35 nm and comprising bismuth oxide, either on or under said third layer.

9. The coated substrate of claim 8, wherein:
   (c) said third layer has a thickness of 5 to 25 nm; and
   (d) said fourth layer has a thickness of 5 to 15 nm.

10. The coating substrate of claim 8, wherein said third layer is between said fourth layer and said functional layer.

11. The coating substrate of claim 8, wherein said fourth layer is between said third layer and said functional layer.

12. The coated substrate of claim 1, further comprising (VI) a protective layer, on said upper coating, having a thickness of 3 to 10 nm and comprising titanium oxide.

13. The coated substrate of claim 1, further comprising (VII) a second functional layer, on said upper coating.

14. The coated substrate of claim 1, further comprising (V) a sacrificial layer, on said functional layer, having a thickness of 0.5 to 6 nm and comprising at least one member selected from the group consisting of niobium, titanium, tin, tantalum, a nickel-chromium alloy, a tantalum-chromium alloy and a niobium-chromium alloy, and wherein:
   said functional layer has a thickness of 7 to 25 nm and comprises silver;

said second layer has a thickness of 16 to 35 nm;

said first layer has a thickness of 5 to 35 nm and comprises a member selected from the group consisting of bismuth oxide, tin oxide and silicon nitride; and said upper coating comprises at least one layer comprising at least one dielectric selected from the group consisting tin oxide, zinc oxide, niobium oxide, titanium oxide, tantalum oxide, bismuth oxide and silicon nitride.

15. A panel, comprising at least one coated substrate of claim 1.

16. The panel of claim 15, wherein said panel has an emissivity of at most 0.05 and a light transmission $T_L$ of at least 75%.

17. The panel of claim 15, wherein said panel has a K factor according to DIN 52612 of approximately 1.1 W/m²K or a G factor according to DIN 67507 of 58 to 60%.

18. A panel, comprising at least one coated substrate of claim 8.

19. The panel of claim 18, wherein said panel has an emissivity of at most 0.05 and a light transmission $T_L$ of at least 75%.

20. A method of making a coated substrate, comprising:

applying a lower coating on a transparent substrate, said lower coating comprising:
  (a) a first layer comprising
    (i) silicon or a metal, and (ii) nitrogen or oxygen, and
  (b) a second layer comprising zinc oxide and having a thickness of at least 16 nm;

applying a functional layer on said lower coating; and applying an upper coating comprising a dielectric material, on said functional layer;

wherein said second layer is in contact with said functional layer; and said functional layer has a thickness of 7 to 25 nm and comprises silver.

21. A coated substrate, comprising:

(I) a transparent substrate;

(II) a lower coating on said transparent substrate, comprising:
  (a) a first layer comprising bismuth oxide; and
  (b) a second layer comprising zinc oxide and having a thickness of at least 16 nm;

(III) a functional layer on said lower coating; and (IV) an upper coating comprising a dielectric material, on said functional layer;

wherein (b) said second layer is in contact with (III) said functional layer.

* * * * *